United States Patent [19]

Sugiura

[11] 4,018,123

[45] Apr. 19, 1977

[54] AUTOMATIC RHYTHM PERFORMING APPARATUS CAPABLE OF EXPRESSING STRESSED AND RELAXED BEATS OF RHYTHM

[75] Inventor: Toshio Sugiura, Hamamatsu, Japan

[73] Assignee: Nippon Gakki Seizo Kabushiki Kaisha, Japan

[22] Filed: Mar. 15, 1976

[21] Appl. No.: 666,906

[30] Foreign Application Priority Data

Mar. 20, 1975 Japan ............................ 50-33573

[52] U.S. Cl. ................................... 84/1.03; 84/1.24

[51] Int. Cl.² ........................................ G01H 1/00

[58] Field of Search ................. 84/1.01, 1.03, 1.17, 84/1.24, 1.26, DIG. 12, DIG. 22

[56] References Cited

UNITED STATES PATENTS

| | | | |
|---|---|---|---|
| 3,247,309 | 4/1966 | Campbell | 84/1.17 |
| 3,646,242 | 2/1972 | Okamoto | 84/1.24 |
| 3,742,112 | 6/1973 | Okamoto | 84/1.03 |
| 3,763,305 | 10/1973 | Nakada et al. | 84/1.03 |
| 3,795,755 | 3/1974 | Uchiyama | 84/1.03 |
| 3,813,472 | 3/1974 | Hirano | 84/1.03 |
| 3,918,341 | 11/1975 | Bunger | 84/1.01 |
| 3,972,258 | 8/1976 | Adachi | 84/1.03 |

*Primary Examiner*—L. T. Hix
*Assistant Examiner*—Vit W. Miska
*Attorney, Agent, or Firm*—Flynn & Frishauf

[57] ABSTRACT

An automatic rhythm performing apparatus comprises a rhythm pattern generator for generating stressed beat pattern pulses representative of stressed beats of a rhythm to be generated and relaxed beat pattern pulses representative of relaxed beats of the rhythm, a tone generator, a rhythm gate coupled to the tone generator and a mute gate coupled to the rhythm gate. The rhythm gate is operative to impart a decayed envelope to a tone signal from the tone generator in reponse to each of the stressed beat pattern pulses and the mute gate is operative to suppress a portion of a decayed output signal from the rhythm gate in response to each of the relaxed beat pattern pulses. The automatic rhythm performing apparatus can be used for an automatic chord performance of a keyboard type electronic musical instrument.

10 Claims, 5 Drawing Figures

AUTOMATIC RHYTHM PERFORMING APPARATUS CAPABLE OF EXPRESSING STRESSED AND RELAXED BEATS OF RHYTHM

BACKGROUND OF THE INVENTION

This invention relates to an automatic rhythm performing apparatus and in particular an automatic rhythm performing apparatus capable of effectively expressing stressed and relaxed beats of a rhythm.

A conventional automatic rhythm performing apparatus is adapted to cause a tone signal from a tone generator to be gated by rhythm pattern pulses corresponding to stressed beats of a rhythm to be generated. Even if in this case a rhythm gate is designed to impart a decayed envelope to the tone signal, the apparatus would provide a monotonous impression to a listener.

SUMMARY OF THE INVENTION

A primary object of this invention is to provide an automatic rhythm performing apparatus capable of effectively expressing stressed and relaxed beats of a rhythm to be generated.

Another object of this invention is to provide an automatic rhythm performing apparatus capable of effectively expressing staccatos and tenutos of rhythm.

A further object of this invention is to provide an automatic chord performance type electronic musical instrument capable of enhancing expressionability.

An automatic rhythm performing apparatus according to this invention comprises rhythm pattern generating means for generating stressed beat pattern pulses representative of stressed beats of a rhythm to be generated and relaxed beat pattern pulses representative of relaxed beats of the rhythm, tone generating means, a rhythm gate coupled to the tone generating means and a mute gate coupled to the rhythm gate.

The rhythm gate is operative to impart a decayed envelope to a tone signal from the tone signal generating means in response to each of the stressed beat pulses and the mute gate is operative to suppress a portion, preferably an intermediate portion, of a decayed tone signal from the rhythm gate in response to each of the relaxed beat pulses from the rhythm pattern generating means.

The automatic rhythm performing apparatus according to this invention is not necessarily required to be incorporated into a keyboard type electronic musical instrument, but it can be used for an automatic chord performance of the keyboard type electronic musical instrument. When the apparatus is used for such a chord performance, a keyboard means including keyers can be coupled between the tone generators and the rhythm gate. If the electronic musical instrument is of a multi-stage type, a lower keyboard may be used as such. If the electronic musical instrument is of a single stage type, a left-hand playing part of the keyboard may be used as such. Alternatively, the keyboard may be a pedal keyboard.

DETAILED DESCRIPTION OF THE PREFERRED EMBODIMENTS

There will now be described one embodiment of this invention as used for an automatic chord playing of a keyboard type electronic musical instrument, though an automatic rhythm performing apparatus according to this invention can be used, for example, with a percussion tone generator irrespective of the keyboard type electronic musical instrument.

Figure 1:
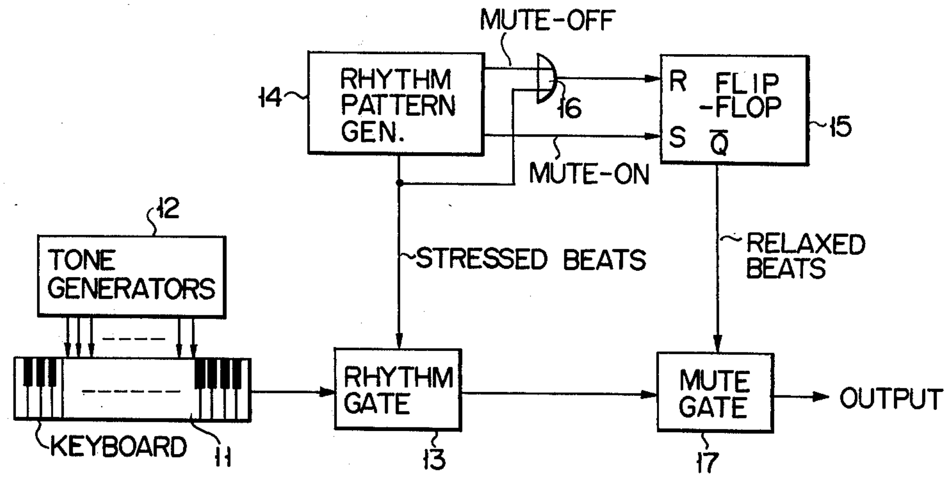
FIG. 1. is a schematic block diagram embodying this invention.

In FIG. 1 reference numeral 11 is a keyboard for chord performance, i.e., a lower keyboard in the case of a multistage keyboard or a left-hand playing part in the case of a single-stage keyboard. A chord performance is made to the accompaniment of a melody performance at an upper keyboard or a right-hand playing part of a single keyboard. In response to the depression of keys on the keyboard 11 tone signals corresponding to the notes of the depressed keys are derived from tone generators 12. The tone signals from the tone generators are then coupled to a rhythm gate 13.

Reference numeral 14 is a rhythm pattern generator which is capable of selecting kinds of rhythms to be generated and adapted to generate stressed beat pattern pulses representative of the stressed beats of a rhythm to be selectively generated and mute-on and mute-off pulses corresponding to relaxed beats of the rhythm.

The stressed beat pattern pulses are coupled to the rhythm gate 13 which imparts a decayed envelope to the tone signals selectively taken out from the tone generators 12 in response to each of the stressed beat pulses. The mute-on pulses are coupled to the set terminal of a flip-flop circuit or bistable circuit 15 and the mute-off pulses are coupled together with the stressed beat pattern pulses, to the reset terminal of the flip-flop circuit 15 through an OR gate 16. The output $\overline{Q}$ of the flip-flop circuit 15 is coupled to a mute gate 17 coupled to receive a decayed output tone signal from the rhythm gate 13. The mute gate 17 is rendered nonconductive in response to the set output $\overline{Q}$ of the flip-flop circuit 15 to cause a portion of the decayed output tone signal to be suppressed. The set output of the flip-flop circuit 15 is generated at the intermediate portion of a time interval between the stressed beat pulses from the rhythm pattern generator 14 and in a shorter period of time than the abovementioned time interval. In consequence, only the intermediate portion of the decayed output signal of the rhythm gate 13 is suppressed. When the flip-flop circuit 15, though not always set during the time interval between the stressed beat pulses, is set during the abovementioned time interval, a relatively large amplitude tone signal and a relatively small amplitude tone signal are taken out from the mute gate 17 at a certain time interval corresponding to the duration of the set output $\overline{Q}$ of the flip-flop 15. These tone signals are coupled to a sound producing means (not shown), thereby effectively sounding stressed and relaxed beats of a rhythm.

Figure 2:
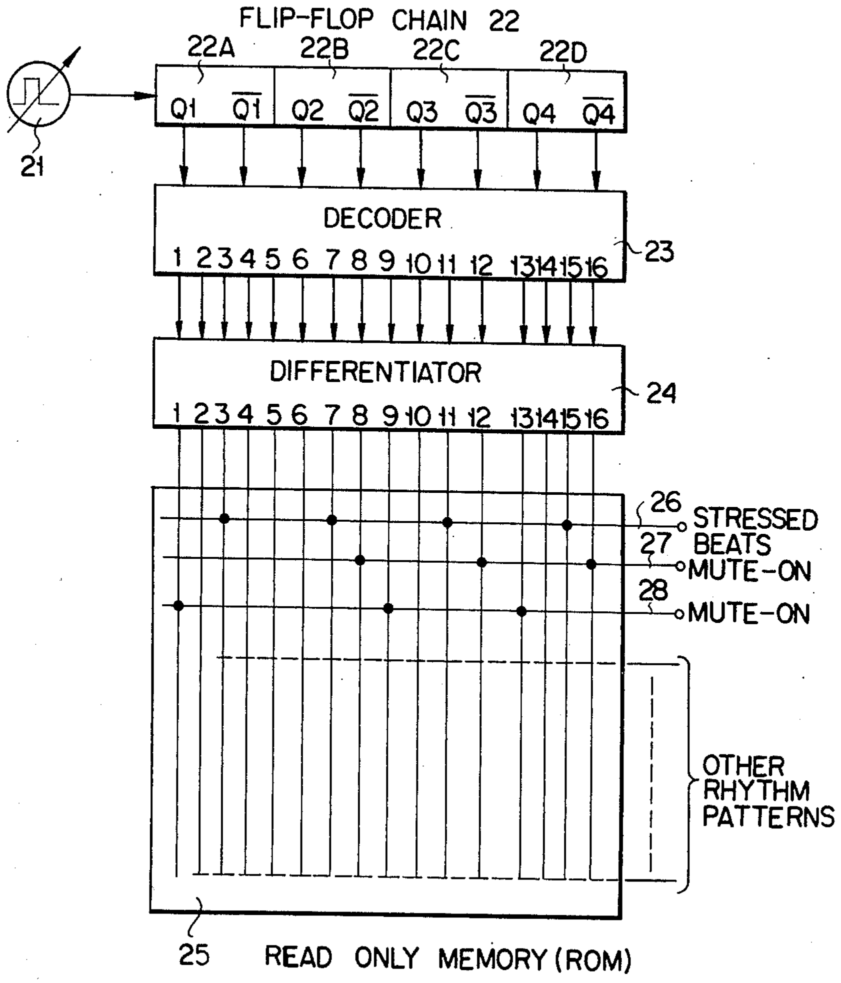
FIG. 2 is a schematic block diagram showing by way of example a rhythm pattern generator in FIG. 1.
Figure 3:
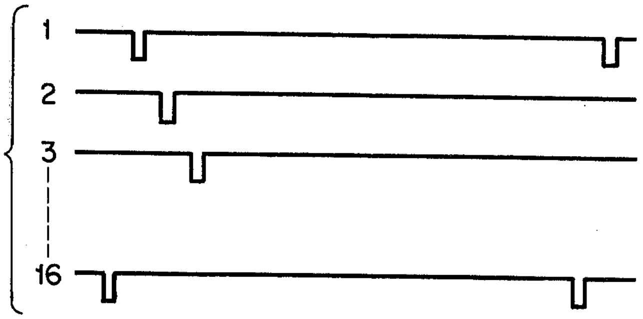
FIG. 3 shows sequential pulses formed by the rhythm pattern generator in FIG. 2.

FIG. 2 shows the rhythm pattern generator 14 by way of example. In FIG. 2 reference numeral 21 is a clock pulse generator of preferably a frequency variable type. The output pulses of the generator are coupled to a frequency divider chain 22 including, for example, four cascade-connected flip-flops 22A to 22D. The complementary pair outputs Q1, $\overline{Q1}$; Q2, $\overline{Q2}$; Q3, $\overline{Q3}$; and Q4, $\overline{Q4}$ of the respective flip-flops are coupled to a known decoder 23 to sequentially generate 16 pulses. These 16 pulses are sequentially delivered to a differentiator 24 to provide 1st to 16th pulses as shown in FIG. 3. These sequential output pulses of the differentiator 24 are applied to a read only memory (ROM) 25 to generate the stressed beat pattern pulses, mute-on pulses and mute-off pulses according to various kinds of rhythms. The three pulse trains for the respective rhythms are applied through a suitable selection means (not shown), to the rhythm gate 13 and flip-flop 15.

Read only memories have been now widely used in various digital systems and therefore, it is easy for those skilled in the art to apply a read only memory to such an automatic rhythm performance apparatus as for the present invention. The read only memory as shown in FIG. 2 may be a diode matrix in which a diode is provided at each of those intersections of the input and output lines of the read only memory which are indicated by heavy dots.

Figure 4:
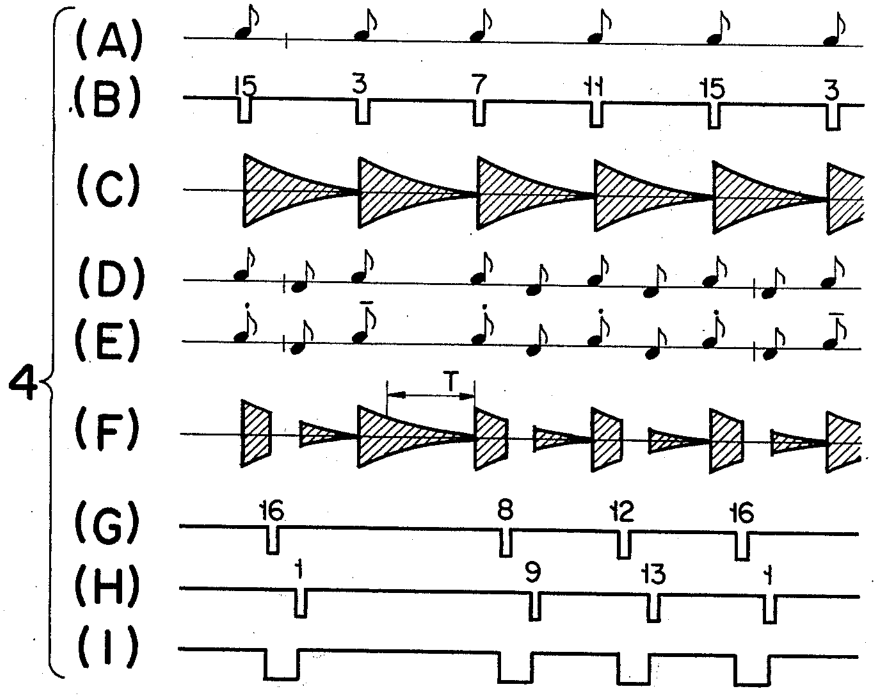
FIG. 4 is a diagram for explaining the operation of this invention.

The operation of the automatic rhythm performance apparatus will now be explained on the basis of a specific rhythm by referring to FIG. 4.

The rhythm pattern of, for example, a beguine is represented as shown in FIG. 4(D). The stressed beats of the rhythm pattern, if indicated with staccato (·) and tenuto (–), are represented as shown in FIG. 4(E). FIG. 4(A) represents a stressed beat pattern only and FIG. 4(B) represents stressed beat pattern pulses corresponding to the stressed beat pattern in FIG. 4(A), which are applied to the rhythm gate 13. Numerals attached to the respective pulses in FIG. 4(B) represent Nos. of the sequential pulses as shown in FIG. 3. In FIG. 2, accordingly the 3rd, 7th, 11th and 15th pulses from the differentiator 24 are coupled to an output line 26 of the read only memory 25 on which the stressed beat pulses are to be appeared. Tone signals applied to the rhythm gate 13 are given decayed envelopes as shown in FIG. 4(C) by the stressed beat pattern pulses. According to the stressed beats of staccato, mute-on pulses as shown in FIG. 4(G) and mute-off pulses as shown in FIG. 4(H) are taken from the read only memory 25. Accordingly, in the read only memory 25 shown in FIG. 2, 8th, 12th and 16th pulses from the differentiator 24 are coupled to an output line 27 on which the mute-on pulses are to be appeared and 1st, 9th and 13th pulses are coupled to the output line 28 on which the mute-off pulses are to appeared. In other words, the read only memory 25 of FIG. 2 operates to couple required sequential pulses to each output line through an OR gate. Since the flipflop 15 is set upon receipt of the mute-on pulse and reset upon receipt of the mute-off pulse, a set output Q as shown in FIG. 4(I) is produced. During the set period of the flip-flop the mute gate 17 is disabled so that the intermediate portion of the decayed tone signal from the rhythm gate 13 is suppressed as shown in FIG. 4(F) after the stressed beat of staccato. After the stressed beat of tenuto no mute-on pulse is generated with the result that the tone signal is not suppressed.

Although in the above-mentioned embodiment the intermediate portion of the decayed tone signal is suppressed in response to the relaxed beats, a tone signal may be suppressed during a time period T within the duration of the decayed tone signal as shown in FIG. 4(F). In this case, for example, a one-shot multivibrator may be triggered by the stressed beat pattern pulses without generating the mute-on pulses from the rhythm pattern generator 14 and the flip-flop 15 be set by the output of the multivibrator.

Figure 5:
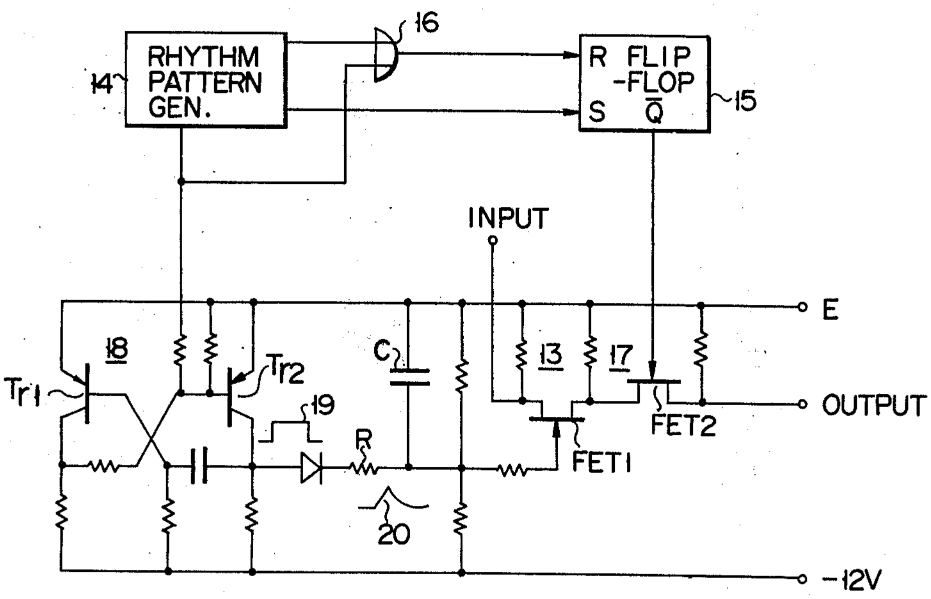
FIG. 5 is a schematic circuit diagram showing, by way of example, a rhythm gate and mute-gate in FIG. 1.

FIG. 5 shows by way of example a circuit arrangement of the rhythm gate 13 and mute gate 17. A one-shot multivibrator 18 including transistors $T_{r1}$ and $R_{r2}$ is triggered by the stressed beat pulse from the rhythm pattern generator 14 as shown in FIG. 4(B) to produce a rectangular wave output 19. The rectangular wave output of the one-shot multivibrator 18 is supplied to an integrator including a capacitor C and resistor R to produce a decayed envelope signal 20. The decayed envelope signal 20 controls the internal resistance of a FET1 of the rhythm gate 13. As a result, output tone signal from the rhythm gate 13 comes to have a decayed envelope as shown in FIG. 4(C). The output of the FET1 is applied to FET2 of the mute gate 17 adapted to be controlled in on-off fashion by the output of the flip-flop 15.

What is claimed is:

1. An automatic rhythm performing apparatus comprising:

rhythm pattern generating means for generating stressed beat pattern pulses representative of stressed beats of a rhythm to be generated and relaxed beat pattern pulses representative of relaxed beats of the rhythm;

tone signal generating means;

rhythm gate means coupled to said tone signal generating means to receive a tone signal and to said rhythm pattern generating means to receive the stressed beat pattern pulses for providing a decayed envelope to the tone signal in response to each of the stressed beat pulses; and mute gate means coupled to said rhythm gate means to receive the decayed tone signal and to said rhythm pattern generating means to receive the relaxed beat pattern pulses for suppressing a portion of the output tone signal of said rhythm gate means in response to each of the relaxed beat pulses.

2. An apparatus according to claim 1, wherein said rhythm pattern generating means comprises:

clock pulse generating means;

means coupled to said clock pulse generating means for producing sequential pulses;

means coupled to said sequential pulse generating means for producing the stressed beat pattern pulses for controlling said rhythm gate means and the relaxed beat pattern pulses for controlling said mute gate means.

3. An apparatus according to claim 1, wherein said mute gate means is operative to suppress an intermediate portion of the decayed tone signal from said rhythm gate means.

4. An apparatus according to claim 2, wherein each of the relaxed beat pulses comprises first and second pulses having a time interval therebetween, and a bistable circuit which is controlled by the first and second pulses is provided, an output of said bistable circuit being coupled to said mute gate means.

5. An automatic rhythm performing apparatus comprising:

rhythm pattern pulse generating means for generating stressed beat pattern pulses representative of stressed beats of a rhythm to be generated, the stressed beat pulses including staccato stressed beats and tenuto stressed beats, and a mute pulse after a lapse of a predetermined time from generation of each staccato stressed beat pulse;

tone signal generating means;

rhythm gate means coupled to said tone signal generating means to receive a tone signal and to said rhythm pattern generating means to receive the stressed beat pattern pulses for providing a decayed envelope to the tone signal in response to each of the stressed beat pulses; and mute gate means coupled to said rhythm gate means to receive the decayed tone signal and to said rhythm pattern generating means to receive the mute pulse for suppressing a portion of the decayed tone signal in response to the mute pulse.

6. An electronic musical instrument comprising:

rhythm pattern generating means for generating stressed beat pattern pulses representative of stressed beats of a rhythm to be generated and relaxed beat pattern pulses representative of relaxed beats of the rhythm;

tone generators;

keyboard means coupled to said tone generators for selectively deriving tone signals from said tone generators in response to depression of keys;

rhythm gate means coupled to said keyboard means to receive tone signals and to said rhythm pattern generating means to receive the stressed beat pattern pulses for providing a decayed envelope to the tone signals in response to the each of the stressed beat pulses; and mute gate means coupled to said rhythm gate means to receive the decayed tone signals and to said rhythm pattern generating means to receive the relaxed beat pattern pulses for suppressing a portion of the decayed tone signals in response to each of the relaxed beat pulses.

7. An electronic musical instrument according to claim 6, wherein said rhythm pattern generating means comprises a clock pulse generating means; means coupled to said clock pulse generating means to produce sequential pulses; and means coupled to receive the sequential pulses for generating the stressed pattern pulses for controlling said rhythm gate means and the relaxed pattern pulses for controlling said mute gate means.

8. An electronic musical instrument according to claim 7, wherein each of the relaxed beat pulses comprises first and second pulses having a time interval therebetween, and a bistable circuit which is controlled by the first and second pulses is provided, an output of said bistable circuit being coupled to said mute gate means.

9. An electronic musical instrument according to claim 6, wherein said mute gate means is operative to suppress an intermediate portion of the decayed tone signal from said rhythm gate means.

10. For use with an electronic musical instrument comprising tone generators and keyboard means coupled to said tone generators for selectively deriving tone signals from said tone generators in response to depression of keys, an automatic rhythm performing apparatus comprising:

rhythm pattern generating means for generating stressed beat pattern pulses representative of stressed beats of a rhythm to be generated and relaxed beat pattern pulses representative of relaxed beats of the rhythm;

rhythm gate means coupled to receive the tone signals derived by said keyboard means from said tone generators and to said rhythm pattern generating means to receive stressed pattern pulses for providing a decayed envelope to the tone signals in response to each of the stressed beat pulses; and mute gate means coupled to said rhythm gate means to receive output signals having the decayed envelope and to said rhythm pattern generating means to receive the relaxed beat pattern pulses for suppressing a portion of the output tone signal of said rhythm gate means in response to each of the relaxed beat pulses.

* * * * *